United States Patent
Puckett et al.

(10) Patent No.: US 8,593,395 B1
(45) Date of Patent: Nov. 26, 2013

(54) DISPLAY RESPONSE ENHANCEMENT

(75) Inventors: Jay Michael Puckett, Cupertino, CA (US); Jyotindra K. Vasudeo, Foster City, CA (US)

(73) Assignee: Amazon Technologies, Inc., Reno, NV (US)

( * ) Notice: Subject to any disclaimer, the term of this patent is extended or adjusted under 35 U.S.C. 154(b) by 711 days.

(21) Appl. No.: 12/730,574

(22) Filed: Mar. 24, 2010

Related U.S. Application Data

(60) Provisional application No. 61/307,242, filed on Feb. 23, 2010.

(51) Int. Cl.
*G09G 3/34* (2006.01)

(52) U.S. Cl.
USPC .......................................... 345/107; 345/204

(58) Field of Classification Search
USPC ................................................ 345/107, 204
See application file for complete search history.

(56) References Cited

U.S. PATENT DOCUMENTS 7,126,577 B2 * 10/2006 Zhou et al. ..................... 345/107
2009/0267953 A1 * 10/2009 Sampsell et al. ............. 345/520
2010/0315326 A1 * 12/2010 Le Chevalier et al. ........ 345/107

* cited by examiner

*Primary Examiner* — Kevin M Nguyen
*Assistant Examiner* — Sepideh Ghafari
(74) *Attorney, Agent, or Firm* — Lee & Hayes, PLLC

(57) ABSTRACT

Display enhancement improves performance of constrained display devices such as electrophoretic displays (EPDs). With display enhancement, a display controller rapidly writes area updates to the display, while a union of the area updates is maintained. Area updates which the display controller cannot present are discarded, while the union provides a representation of what area on the screen has been affected. A repair operation takes place which generates an area update encompassing the areas which may have been affected.

21 Claims, 9 Drawing Sheets

DISPLAY RESPONSE ENHANCEMENT

PRIORITY

The present application claims priority to U.S. Provisional Application Ser. No. 61/307,242, filed on Feb. 23, 2010, entitled "Display Response Enhancement." This pending provisional application is herein incorporated by reference in its entirety, and the benefit of the filing date of this pending application is claimed to the fullest extent permitted.

BACKGROUND

Electronic devices such as electronic book reader devices (eBook reader devices), cellular telephones, portable media players, desktop computers, laptops, tablet computers, netbooks, personal digital assistants, and the like, may provide a display device for user interaction. However, display devices may be limited in functionality or otherwise be constrained due to technology choices, which may result in varying responsiveness to user inputs. Thus, for such constrained displays, it would be desirable to provide a more consistent and responsive experience to users.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
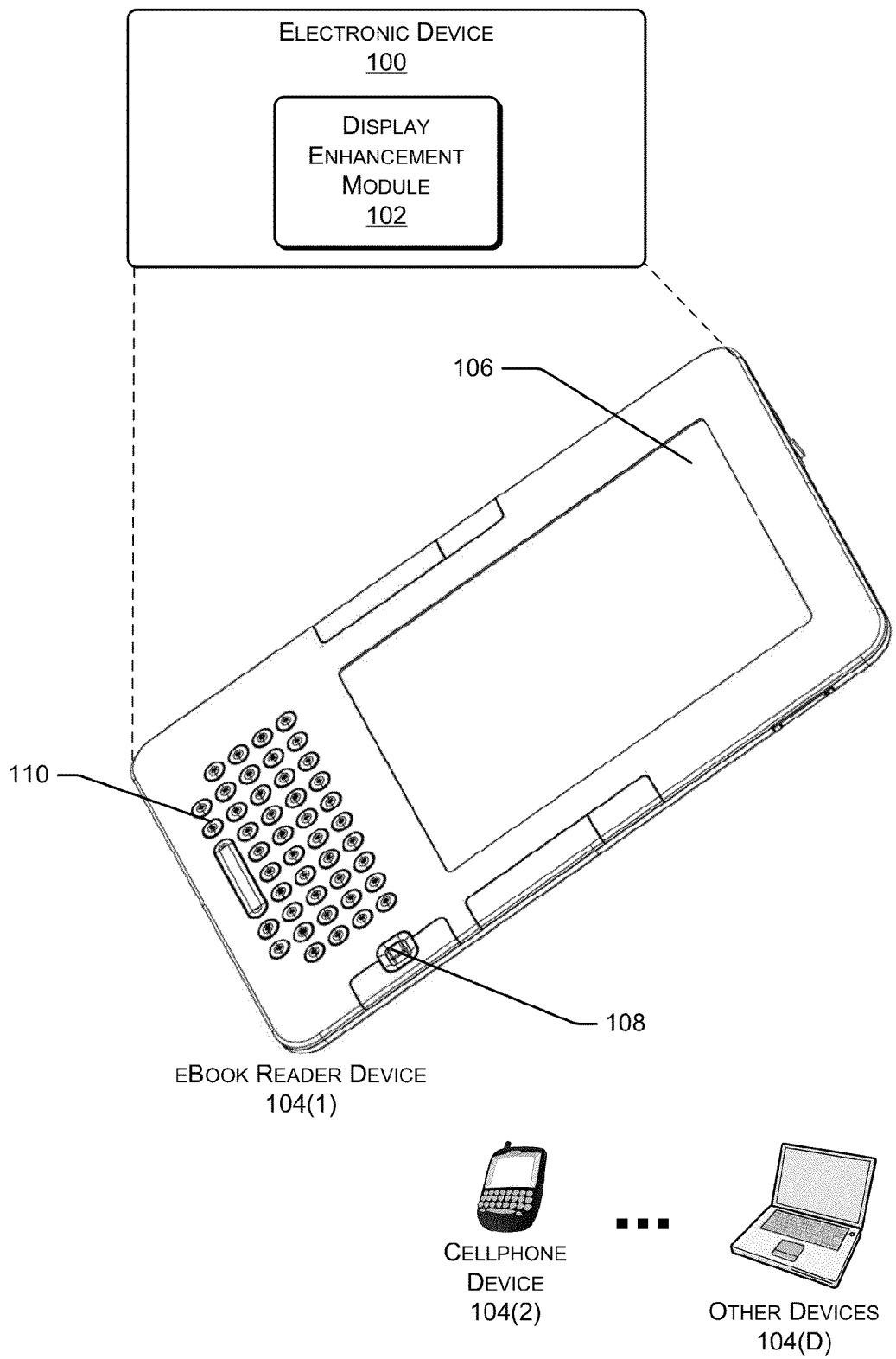
FIG. 1 is an illustrative electronic book (eBook) reader device configured to enhance display on a constrained display using a display enhancement module.

A constrained display may present graphical elements upon a screen differently than users may expect. For example, constrained display devices have slower redraw rates, different pixel transitions, and so forth which are different from what a user has experienced with non-constrained displays, or displays with differing constraints.

A comparison of different display types illustrates some constraints. For example, electrophoretic displays (EPDs) rely upon movement of small particles to form pixels which in turn generate an image on a display. Unlike a liquid crystal display (LCD), an EPD is bistable, and retains its state without continued power. Thus, while continuous refresh of pixels forming an image is necessary to maintain an image on the LCD, the pixels in an EPD retain their state without refresh.

This difference in how the pixels are maintained results in a constraint. While the LCD has the ability to transition pixels at about 25 times per second or more, the EPD display is constrained in that its pixels take longer to transition between states. For example, an EPD may be able to transition a pixel about ten times per second or less. Thus, the time required for the EPD pixel to transition acts as a constraint.

Constraints may result in a presentation on screen which differs from what users have become accustomed to with other display types, such as with an LCD display. For example, when trying to animate the motion of elements across a display the constraints of the EPD may result in a slow moving cursor compared to another display, such as the LCD.

While the constraints have been described with regards to pixel transition rates, other types of constraints are possible. For example, electrowetting displays may require different times to render particular colors, and so forth. The techniques described herein are applicable to other constraints, and other display technologies.

Displays which maintain stable pixel configurations without constant refresh, such as EPD, electrowetting, and so forth, may be configured to allow addressing of portions of the display. Pixels within the addressed portion may thus be transitioned without affecting pixels outside of the addressed portion. Thus, a particular area of pixels may be updated. These area updates may vary in size from a single pixel to the entire display. Unless otherwise indicated herein, "area update" indicates an update to less than the entire display area.

Traditionally, a display controller receives area updates in sequence for presentation on a display, with each area update presented on the display sequentially. This maintains a high fidelity of the on-screen display, such that the image as generated by an application and maintained in an image buffer is the image actually presented by the display.

One example of this sequential approach includes the animation of a moving cursor. This animation may comprise area updates to draw the cursor rectangle, erase the cursor rectangle from the previous location, draw another cursor rectangle in a new location, erase that cursor rectangle, and so forth. Given a display constrained by a slow pixel transition rate, such conventional methods result in a slow moving cursor upon receiving a user input to move the cursor. This slow moving cursor can result in a user experience which differs from that which is expected.

This disclosure describes, in part, techniques for enhancing display on constrained display devices and providing a more rapid response to user input, such as cursors, pointers, touch indicators, and so forth.

An application generates elements for presentation on a display. A display driver, in turn, processes these elements to generate area updates suitable for the display controller. The display driver also accumulates a union of the area updates sent to the display controller. For example, a union of two rectangular area updates would itself be a rectangle incorporating the area of the two area updates.

The area updates may be stored in a buffer, such as an update frame buffer before being sent by the display controller to the display device. As described in this disclosure, area updates which cannot be processed by the display controller may be discarded. While this results in a loss of fidelity, this increases the responsiveness of the display. An area update may be discarded for many reasons. For example, the area update may conflict with, and intrude upon, a portion of the display which is locked for another area update.

When the display controller cannot process the area update, the device proceeds to the next area update. When the display controller is ready and able to, such as when no conflicts exist with current area updates, the next area update may be executed.

A continuous stream of updates to portions of the screen may result in presentation of unwanted elements, ghosting, and so forth. Thus, the display, or portions thereof, may be considered "dirty" or "torn" as a result of the cursor movement. A complete update of the screen would resolve the dirty state of the screen. However, such a full screen update may be distracting to a user and time intensive. For example, a full screen area update on an EPD with a high fidelity flashing update may take about one second and result in the display momentarily presenting an inverted or altered image. Thus, to improve the user experience full screen updates, both flashing and non-flashing, may be minimized.

In a flashing update, also known as a high-fidelity update, pixels within the updated portion of the display are toggled back and forth between several states to minimize residual images (ghosting) or other artifacts. In contrast, a non-flashing update, also known as a high speed update may only change the state of the pixels once. As a result, ghosting or other artifacts may be present.

Because a dirty screen may be distracting or otherwise undesirable, and given the area updates which were discarded by the display controller, the image on the display is repaired to restore fidelity. In one implementation, a repair may be initiated by a repair timer expiring. The repair timer may be configured to call a repair operation when a pre-determined time has passed with no screen updates.

During a repair, rather than updating the entire screen, the display driver uses an accumulated union of the area update rectangles. Thus, the display driver has a defined area described by the union in which repair is necessary. During repair the area represented by the union of the area update rectangles, as maintained since the last repair, is redrawn. In some implementations, the image data representing the area update rectangles may be retrieved from the image buffer.

Repairs may result from conditions other than a timer expiring. For example, repairs may be initiated when a pre-determined interval with no screen updates has expired, upon completion by a user of an input, according to a heuristic monitoring of the cleanliness of the display, and so forth.

Non-flashing updates, such as those which may be made during repairs, eventually may leave behind ghosting or other image artifacts. Thus, upon reaching a pre-determined limit or set of conditions, the entire display may be completely redrawn, such as with a flashing update.

The techniques described herein may be implemented by an electronic device with a processor, internal rewriteable memory and external memory, such as an electronic book (eBook) reader device or any other type of electronic device. The device, such as the eBook reader device, incorporates at least one processor executing an operating system, including, but not limited to, Linux®, UNIX®, Microsoft Corporation's Microsoft Windows®, Microsoft Corporation's Windows Mobile®, Apple Corporation's Mac OS®, Apple Corporation's Mac OS X®, and Wind River Systems Inc.'s VxWorks® operating systems.

The example eBook reader device discussed herein may incorporate a processor from Freescale Semiconductor Inc. of Austin, Tex. using an i.MX architecture and executing a Linux® kernel. The kernel may use a device driver to communicate with peripherals such as an external memory interface (EMI), Universal Serial Bus (USB) controller, image processing unit (IPU), and so forth. These peripheral devices may reside on the same "chip" or die as the processor as in the case of the i.MX architecture, be on another die, or a combination of the same die and another die. A configuration where one or more processors and associated peripherals are on the same die may be known as a "system on a chip" (SOC).

The example eBook reader device discussed herein may also incorporate an electrophoretic display such as the Vizplex™ imaging film from E Ink Corporation of Cambridge, Mass.

Other architectures including processors may be used. For example, some of these architectures include the Open Multimedia Application Platform (OMAP) from Texas Instruments Inc. of Dallas, Tex.; Marvell platform from Marvell Technology Group Ltd. of Santa Clara, Calif.; the x86 platform from Intel Corporation of Santa Clara, Calif.; the MIPS platform from MIPS Technologies Inc. of Sunnyvale, Calif.; and so forth.

While this overview describes enhancing an EPD in terms of an eBook reader device, the concepts described herein may also be applicable to other display types and other devices such as cellular telephones, portable media players, desktop computers, laptops, tablet computers, medical devices, servers, netbooks, servers, personal digital assistants, and so forth.

Illustrative eBook Reader Device

FIG. 1 is an illustrative electronic device 100 configured to enhance a display by way of a display enhancement module 102. The display enhancement module 102 provides instructions that, when executed, alter how electronic device 100 draws elements to a constrained display. The display enhancement module 102 works in conjunction with an image processing unit, display controller, display unit, and is discussed in more detail below with regards to FIG. 2.

Several devices are shown in this illustration that may utilize the display enhancement module 102. For example, an electronic book (eBook) reader device 104(1) is shown embodied as a handheld, dedicated eBook reader device. FIG. 1 also illustrates that a cellphone device 104(2) and other devices 104(D), such as a netbook computer, may include and implement the suspend with internal rewriteable memory module 102. As used herein, letters within parenthesis such as "(D)" indicate an integer number greater than zero.

The eBook reader device 104(1) may have a display 106 to present content in a human-readable format to a user. The display 106 may be reflective, emissive, or a combination of both. Reflective displays utilize incident light and include electrophoretic displays, interferometric modulator displays, cholesteric displays, and so forth. Emissive displays do not rely on incident light and, instead, emit light. Emissive displays include backlit liquid crystal displays, time multiplexed optical shutter displays, light emitting diode displays, and so forth. When multiple displays are present, these displays may be of the same or different types. For example, one display may be an electrophoretic display while another may be a liquid crystal display.

The content presented on the display 106 may take the form of electronic books or "eBooks." For example, the display 106 may depict the text of the eBooks and also any illustrations, tables, or graphic elements that might be contained in the eBooks. The terms "book" and/or "eBook," as used herein, include electronic or digital representations of printed works, as well as digital content that may include text, multimedia, hypertext, and/or hypermedia. Examples of printed and/or digital works include, but are not limited to, books, magazines, newspapers, periodicals, journals, reference materials, telephone books, textbooks, anthologies, instruction manuals, proceedings of meetings, forms, directories, maps, web pages, and so forth. Accordingly, the terms "book" and/or "eBook" may include any readable or viewable content that is in electronic or digital form.

The display 106 may further include touch screen capabilities that allow user input through contact or gesturing relative to the display. For convenience only, the display 106 is shown in a generally rectangular configuration. However, it is understood that the display 106 may be implemented in any shape, and may have any ratio of height to width. Also, for stylistic or design purposes, the display 106 may be curved or otherwise non-linearly shaped. Furthermore the display 106 may be flexible and configured to fold or roll.

The eBook reader device 104(1) may also incorporate a keypad that includes one or more actuable controls 108 and a keypad 110 for user input. The one or more actuable controls 108 may have dedicated or assigned operations. For instance, the actuable controls 108 may include a joystick, page turning buttons, navigational keys, a power on/off button, selection keys, touchpad, and so on. Furthermore, the keypad may include any other controls configured to receive any other sort of user input via buttons, touch screen inputs, or the like.

While one embodiment of electronic device 100 is shown in relation to the eBook reader device 104(1), it is understood that electronic device may include cellular telephones 104(2), and other devices 104(D) such as portable media players, desktop computers, laptops, tablet computers, netbooks, personal digital assistants, servers, medical devices, and the like.

Figure 2:
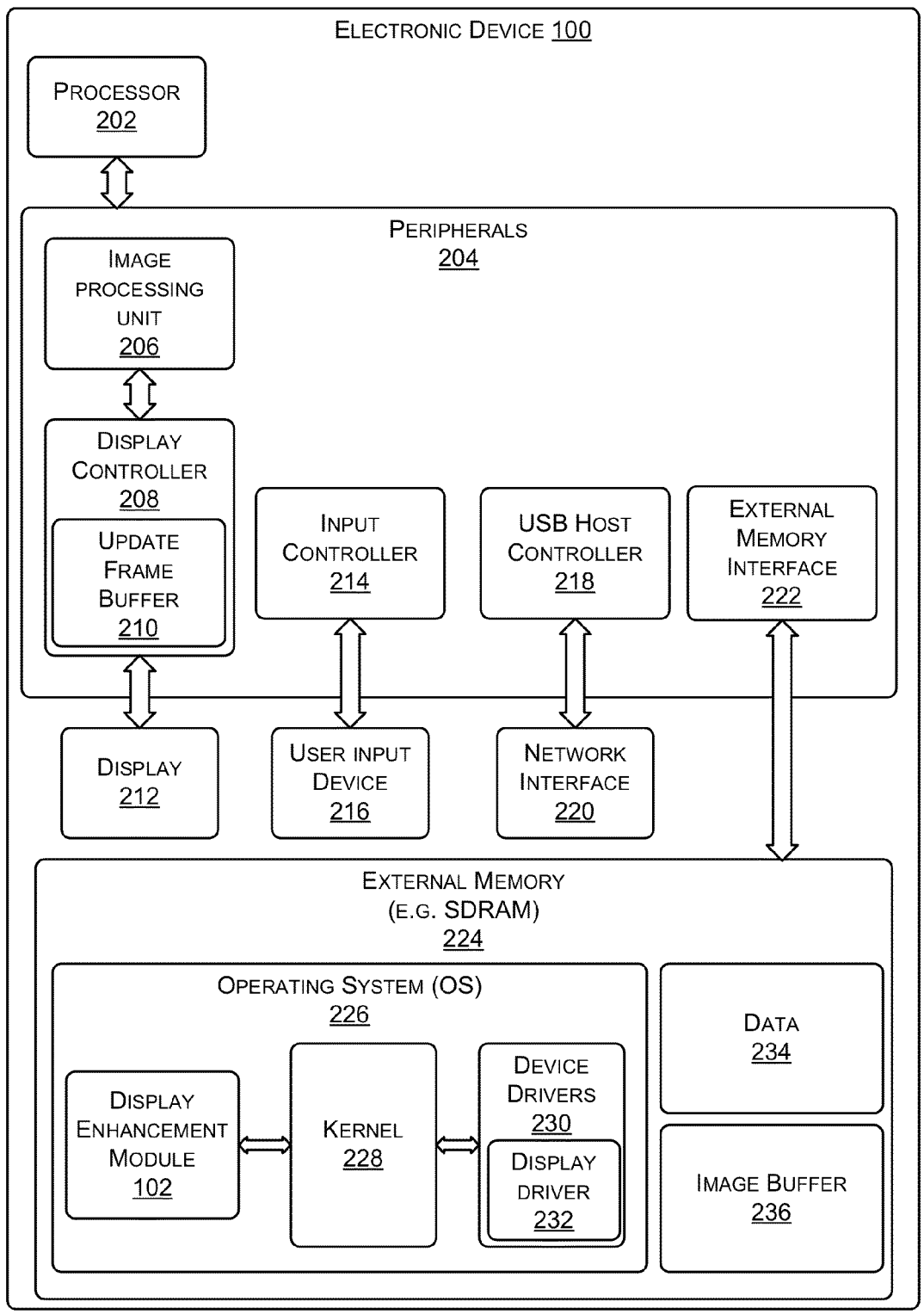
FIG. 2 is an illustrative schematic of an electronic device, such as the eBook reader device of FIG. 1, configured to enhance presentation on a constrained display using a display enhancement module.

FIG. 2 illustrates selected functional components 200 that might be implemented in the electronic device 100. In a very basic configuration, the device 100 includes one or more processors 202. Each processor 202 may itself comprise one or more processors.

One or more peripherals 204 may couple to the processor 202. For instance, FIG. 2 illustrates an image processing unit 206 coupled to a display controller 208. The image processing unit 206 may be configured to generate images for presentation upon instruction by an application, while the display controller 208 convert these instructions into commands and corresponding electrical signals which drive a display 212. The display controller 208 may be coupled to an update frame buffer 210 which in turn is configured to store area updates pending presentation on the display 212.

The electronic device may include one or more displays 212. For example, this display 212 may be display 106 on eBook reader device 104(1) described above. In some implementations, multiple displays may be present and coupled to the image processing unit 206. In some implementations, one or more image processing units 206 may couple to the multiple displays.

The electronic device 100 may have a keypad that may be the same, for example, as the keypad on eBook reader device 104(1) described above with reference to FIG. 1. The electronic device 100 may also have user actuable controls 108.

Coupled to the processor 202 may be an input controller 214. The input controller 214 may be considered to accept input from a user input device 216, such as a touch sensor, keypad, keyboard, mouse, and so forth. In some implementations the user input device 216 may be coupled to a USB host controller 218.

FIG. 2 also illustrates that the electronic device 100 may include the USB host controller 218. The USB host controller 218 manages communications between devices attached to a universal serial bus (USB) and the processor 202 and other peripherals. The USB host controller 218 may couple to a network interface 220 via the universal serial bus. Network interface 220 may allow for connection to wired or wireless local or wide area networks.

Also coupled to processor 202 may be an External Memory Interface (EMI) 222 which in turn couples to external memory 224. The EMI 222 manages access to data stored in the external memory 224. The external memory 224 may comprise Static Random Access Memory (SRAM), Pseudo-static Random Access Memory (PSRAM), Synchronous Dynamic Random Access Memory (SDRAM), Double Data Rate SDRAM (DDR), or other computer-readable storage media.

The external memory 224 may be used to store any number of functional components that are executable on the processor 202, as well as data including content items such as eBooks. Thus, the external memory 224 may store an operating system 226 comprising a kernel 228 operatively coupled to one or more device drivers 230. Device drivers 230, such as display driver 232, are also operatively coupled to peripherals 206. The kernel 228 may also couple to the display enhancement module 102, as introduced above with respect to FIG. 1. In some implementations, the display enhancement module 102 may be internal to the kernel 228, one or more device drivers 230, display driver 232, or a combination thereof.

The electronic device 100 may also include other non-illustrated peripheral devices. These other devices may include a Firewire bus, camera, global positioning system, Bluetooth™ wireless interface, PC Card component, hard drive which may use magnetic or optical memory on spinning disks or solid state storage, and so forth.

Couplings, such as that between the kernel 228 and the device drivers 230, are shown for emphasis. There are couplings between many of the components illustrated in FIG. 2, but graphical arrows are omitted for clarity of illustration.

Figure 3:
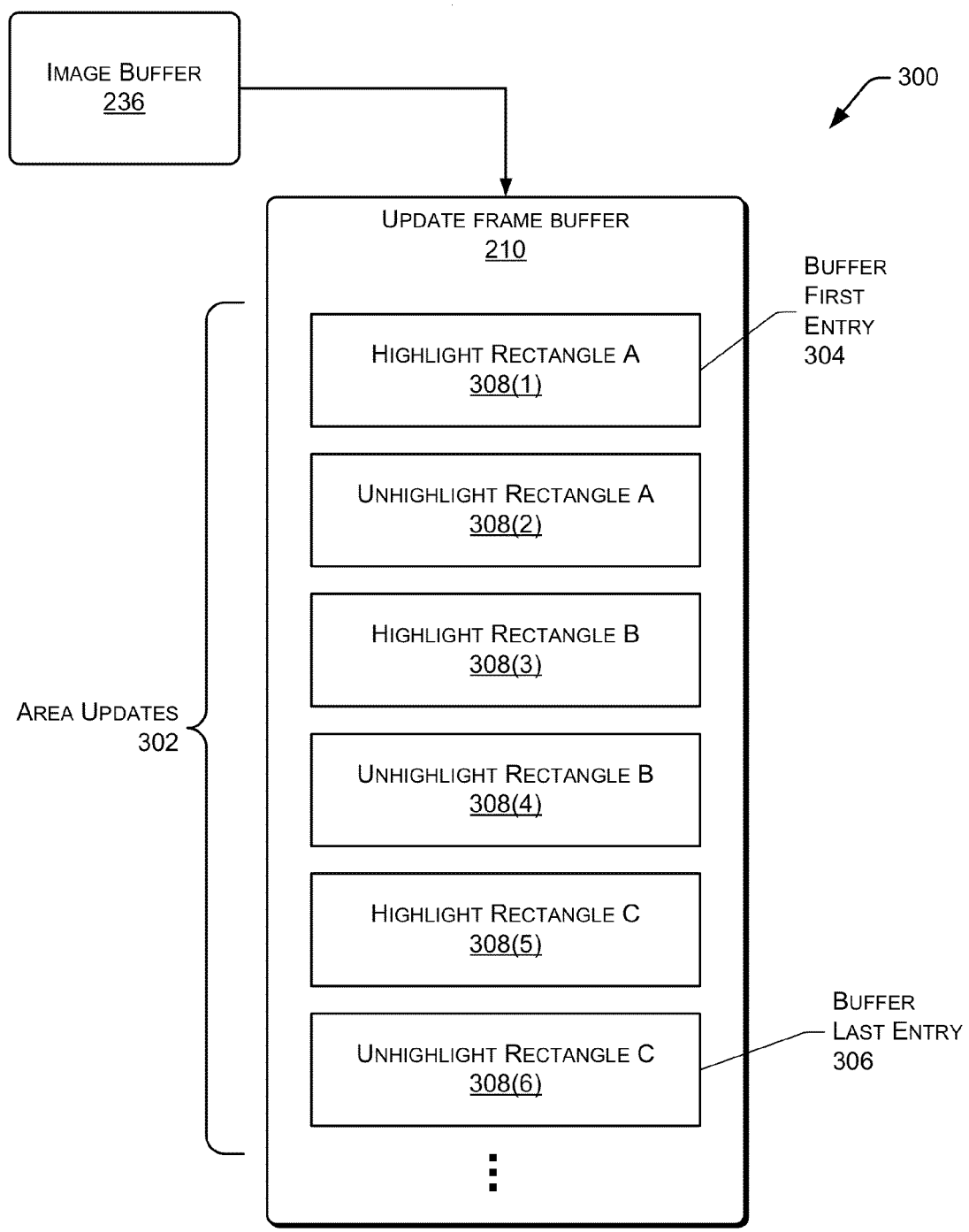
FIG. 3 is an illustration of an example configuration of an update frame buffer and a sequence of area updates queued for presentation on the constrained display.

FIG. 3 is an illustration of an example configuration 300 of the update frame buffer 210. Shown within the update frame buffer 300 is a sequence of area updates 302 received by the image processing unit 206 for presentation on the display 212 which is constrained. In this illustration, the update frame buffer 210 may be considered to fill downwards, with a buffer first entry 304 appearing at the top of the buffer while the last, and most recently received, buffer last entry 306 appears at the bottom.

The update frame buffer 210 contains area updates which, when sent by display controller 208 to the display 212, present or alter the presentation of elements presented upon the display 212.

For example, consider a cursor moving through text on a page. A "highlight rectangle A" area update 308(1) draws a cursor rectangle. A "unhighlight rectangle A" area update 308(2) may then erase the previous cursor rectangle. A series of these area updates 308(1), . . . 308(C) may thus be present within the update frame buffer 210 to provide for the animated movement of a cursor across the display 212.

Constraints may limit which and when area updates may be sent by the display controller 208 from the update buffer 210 to the display 212. For example, one such constraint may be that the display controller 208 is unable to process two or more contemporaneous area updates which overlap a common area on a display.

However, given display constraints such as the time for pixels in the EPD display to transition between states such as white and black, waiting for all area updates to complete may unacceptably slow down presentation. Thus, rather than waiting for each area update to complete, area updates which are unable to be processed by the display controller 208 are dropped.

This results in a display presentation which has a lower fidelity than that intended by an application and which is stored in the image buffer 236. However, the presentation of elements on the display such as a moving cursor is improved because the user input is more quickly transformed into a visible effect upon the display 212. Thus the user experience is enhanced.

Figure 4:
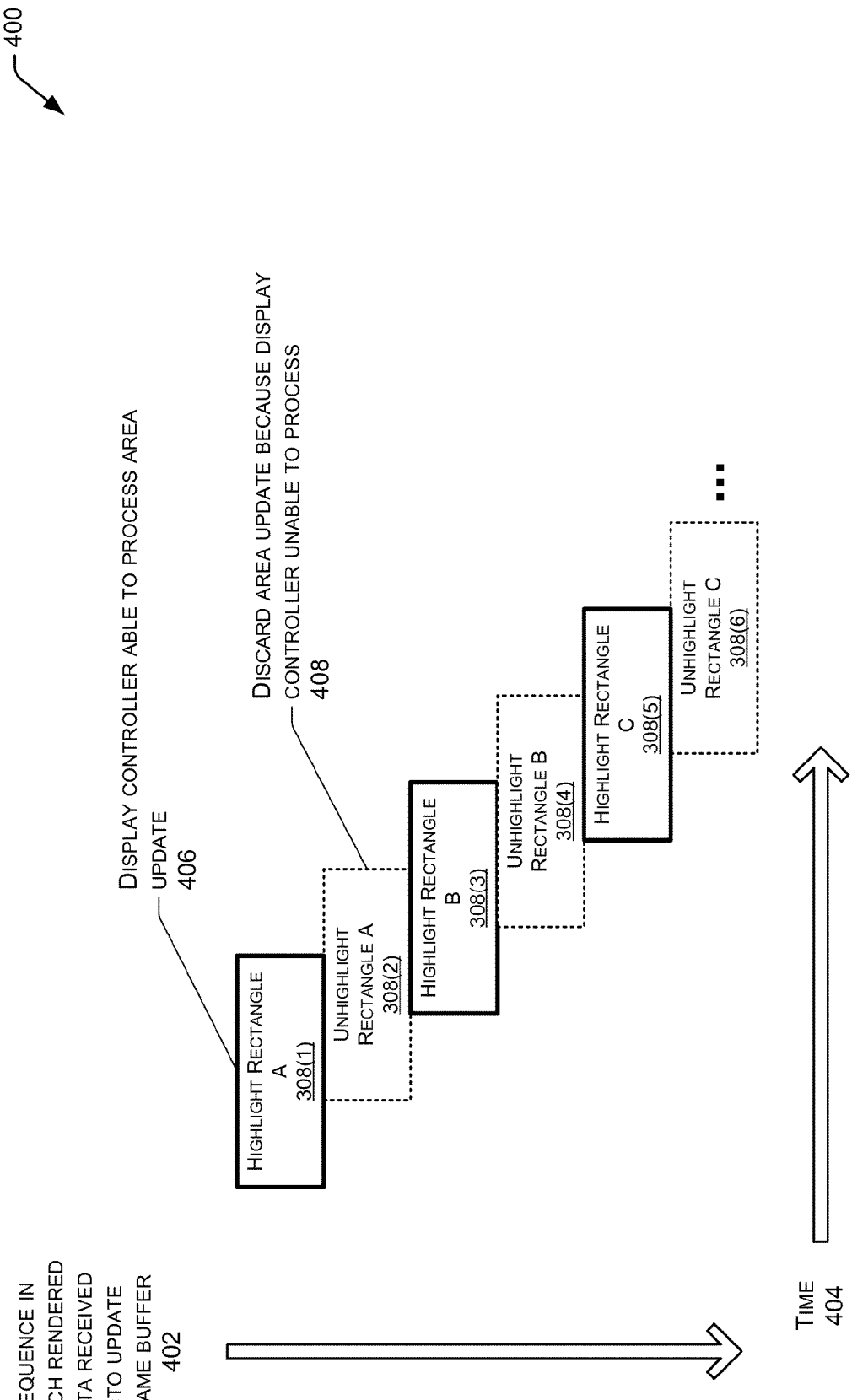
FIG. 4 is an illustration of a display controller transferring selected area updates from the update frame buffer to the display as time progresses.

FIG. 4 is an illustration of transferring 400 selected area updates 308(1), . . . , 308(6) from the update buffer 210 to the display 212, as time progresses and given one or more constraints of the display 212. In this illustration, the sequence in which area updates are received into the update frame buffer 210 is indicated by arrow 402 pointing down the page, such that area updates which appear later appear further down the page. Also shown is a progression of time along the direction of arrow 404, such that time increases from left to right on the page.

As shown here, the series of area updates 308(1)-308(6) from FIG. 3 have been received at the display controller 208 for presentation on the display 212. As described above with regards to FIG. 3, in this example, these area updates have been generated to successively draw and erase a cursor to animate cursor movement across the screen. Given the constraints of the system, not all area updates are sent to the display 212. As indicated in this illustration, the area updates which the display controller 208 is able to present on the display 212 show a solid line border 406. Those area updates which were unable to be presented and which are discarded are indicated with a broken line border 408.

As described above, area updates which overlap may be constrained by the display controller 208, the display 212, and so forth. The overlap may be defined in terms of contemporaneous access to a given pixel or area. As shown in this example, the area update 308(1) provides for "highlight rectangle A." However, while that area update is taking place on the display 212, another area update 308(2) for "unhighlight rectangle A" has been received for presentation by the display controller 208. Because the highlight area update of 308(1) on rectangle A is still taking place, the overlapping unhighlight area update 308(2) on the same rectangle is disallowed. This disallowed area update may be discarded, and the display controller 208 may proceed onto the next area update.

The following area update 308(3) for "highlight rectangle B" does not overlap the area update 308(1) which is still in progress, and thus may be sent to the display 212 for presentation. However, the following screen update 308(4) for "unhighlight rectangle B" is discarded because it overlaps the previous area update 308(3) which is still in progress.

By allowing the rapid application of area updates, and discarding area updates which are disallowed, elements presented upon the display 212 are more rapidly updated. Thus, while the overall constrains of the display 212 have not changed, the user experiences very rapid visual feedback.

As mentioned above, because some of the area updates have been discarded, the presentation which appears on the display 212 may not be of the expected high fidelity, such as found in image buffer 236. After a pre-determined interval of no area updates, a pre-determined threshold, and so forth, a repair of the portions of the display affected by the area updates 302 may take place. Thus, a repair may take place to update the portion or portions of the screen which were affected. Repairs are described in more depth below with regards to FIG. 6.

Figure 5A:
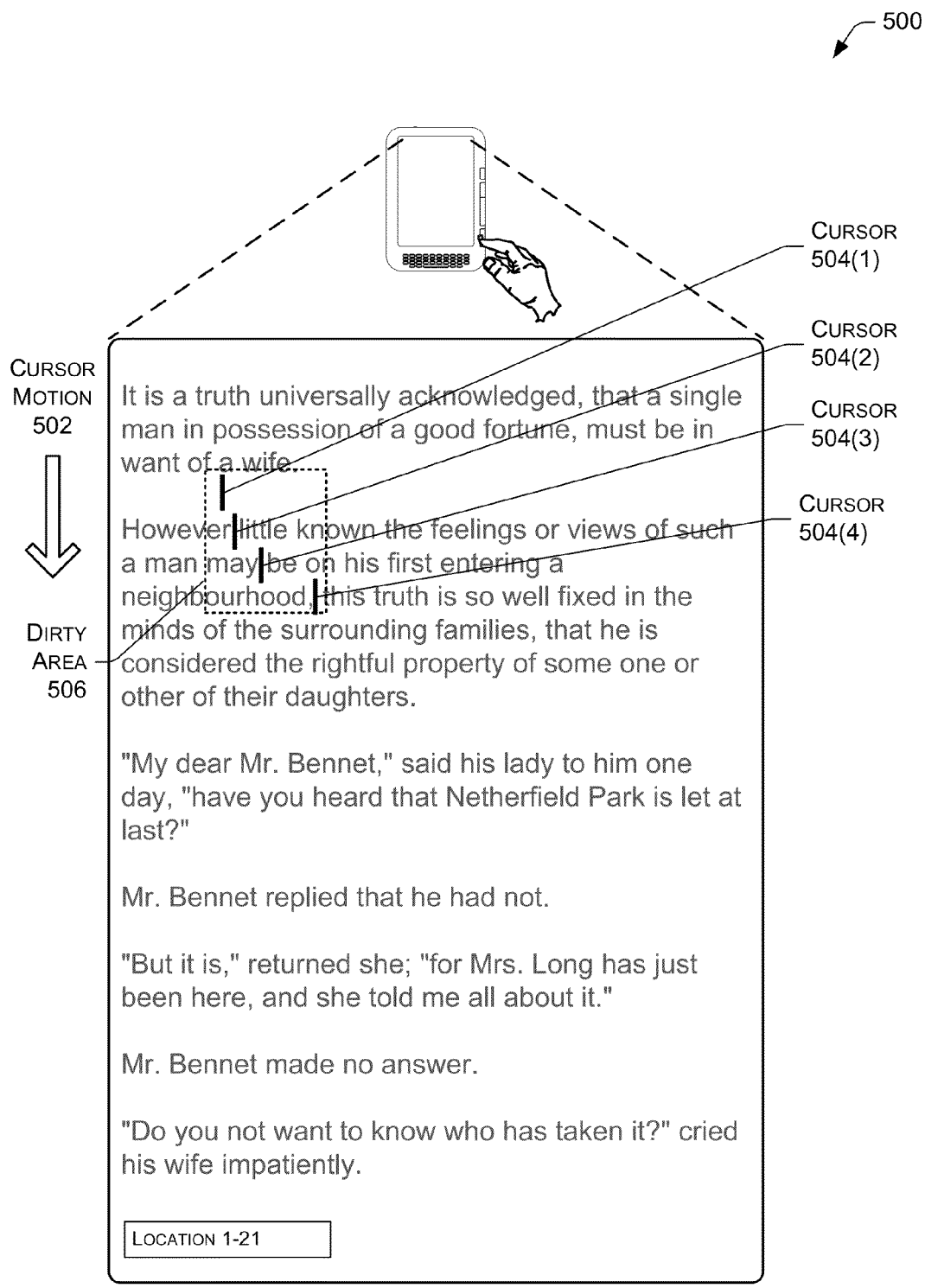
FIGS. 5A-5C illustrate example user interfaces showing movement of a cursor under resulting from user input, and enhancement of the presentation of the cursor using the display enhancement module.
Figure 5B:
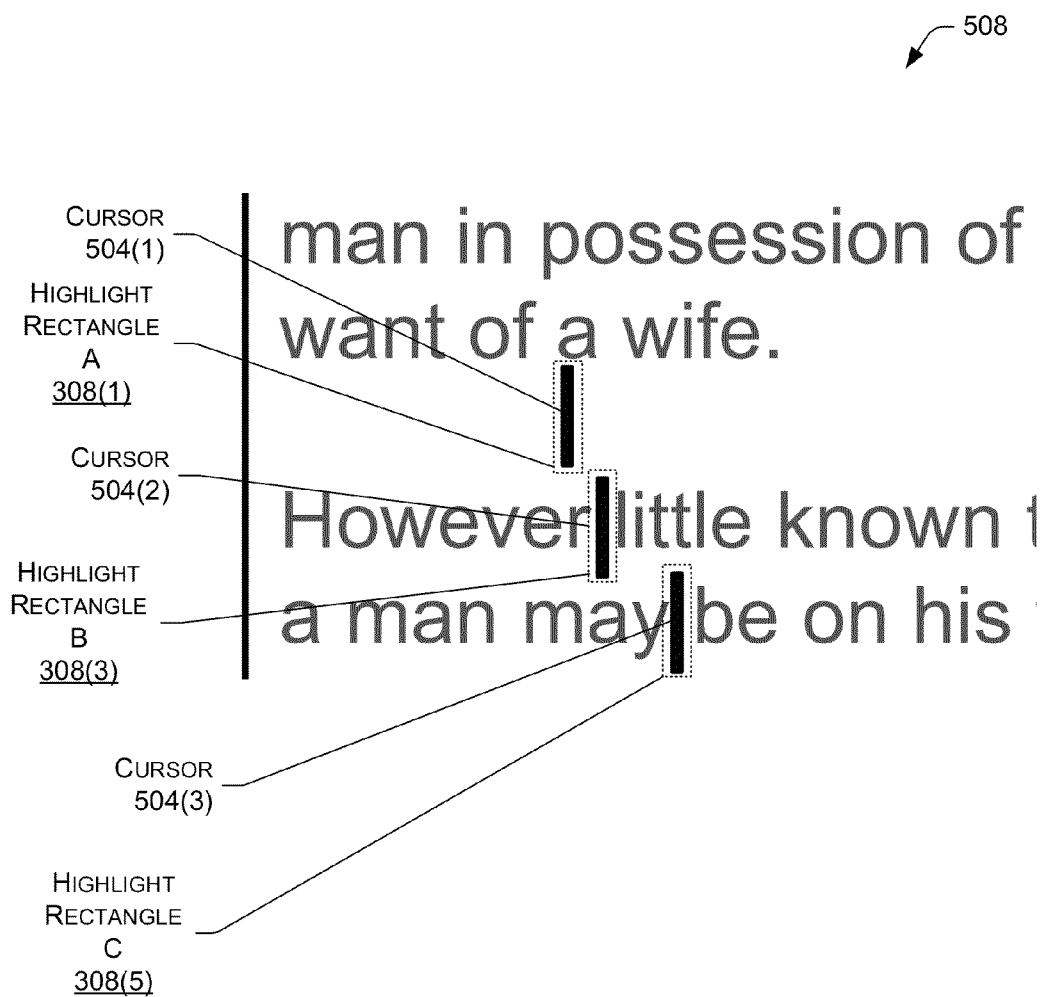
Figure 5C:
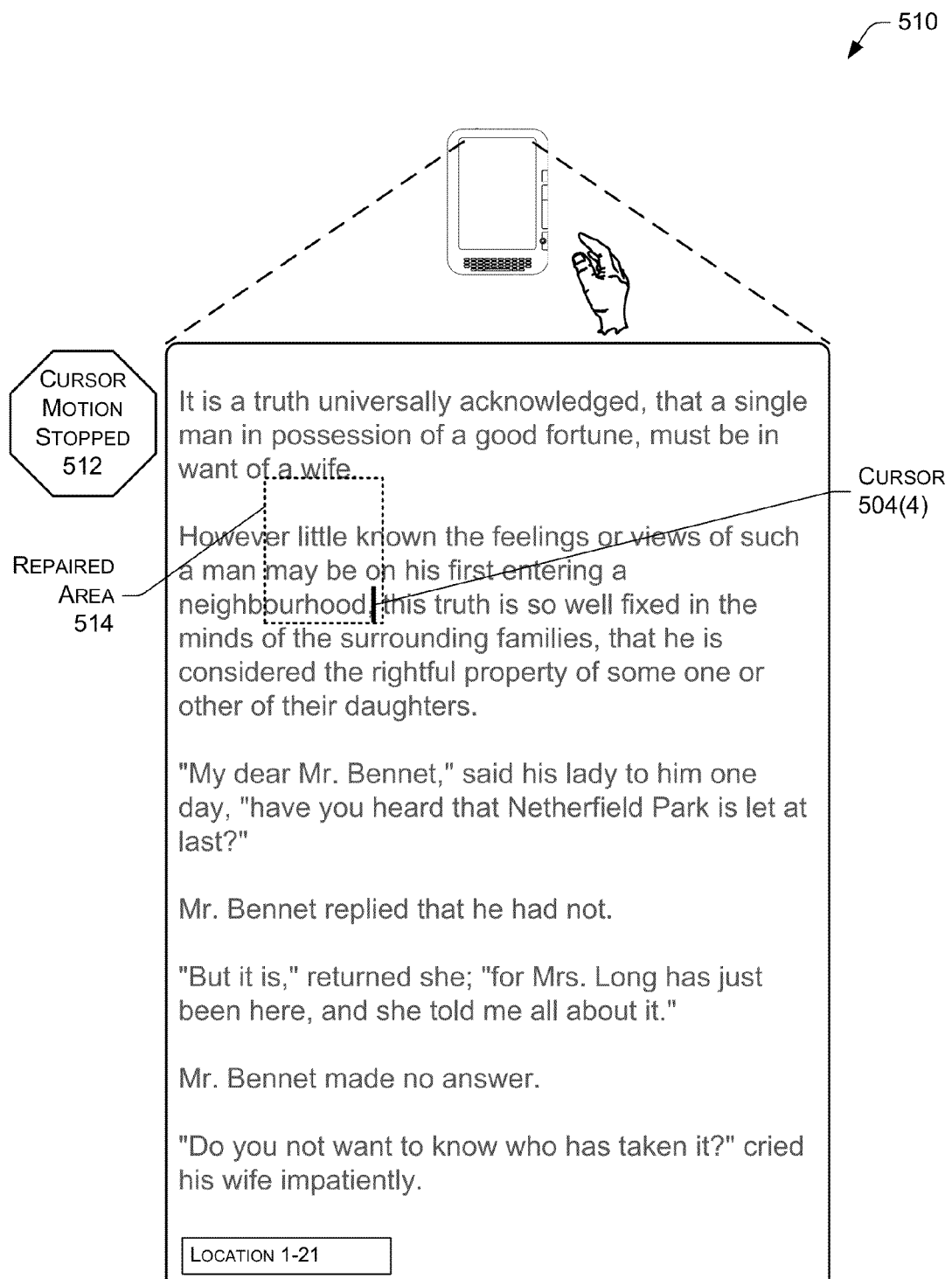

FIGS. 5A-5C illustrate example user interfaces on the eBook reader device 104(1) wherein the display 212 is an electrophoretic display. FIG. 5A shows a user interface 500 after the user has initiated a down-cursor movement using the user actuable control 108. In this example, cursor motion is generally down the screen as indicated by arrow 502. However, cursor motion may be made in other directions such as up, down, diagonally, and so forth.

Starting with cursor 504(1), area updates 302 are issued to the display controller to highlight and successively unhighlight previous cursor rectangles. However, the unhighlight area updates are discarded as described in FIG. 4 because the display controller 208 is not able to process those unhighlight area updates due to overlaps with the highlights which are still in progress. Thus, a series, or trail, of cursors appears on the screen, ending with cursor 504(4) in FIG. 5A. A "dirty" area 506 indicated on the screen with a broken line shows where a repair will be called for later because area updates may have been discarded. This dirty area may be determined by the display driver 232 as a union of the rectangles within the area updates 302, including those which were discarded.

Turning to FIG. 5B, an enlargement 508 of the cursors is presented. In this enlargement, the cursors 504(1)-(3) are shown with the corresponding highlight area updates 308(1), 308(3) and 308(5), respectively. Due to the discard of the unhighlight area updates 308(2), 308(4), and 308(6), a trail of cursors has been left.

In FIG. 5C, the user interface 510 reflects that the user has stopped the cursor-down motion 512. A repair operation is initiated on the dirty area 506, as described below in more depth with regards to FIG. 6. After completion of the repair, the cursor trail has been removed and the repaired area 514 now accurately presents the high fidelity contents of the image buffer 236.

Illustrative Process for Display Enhancement

Figure 6:
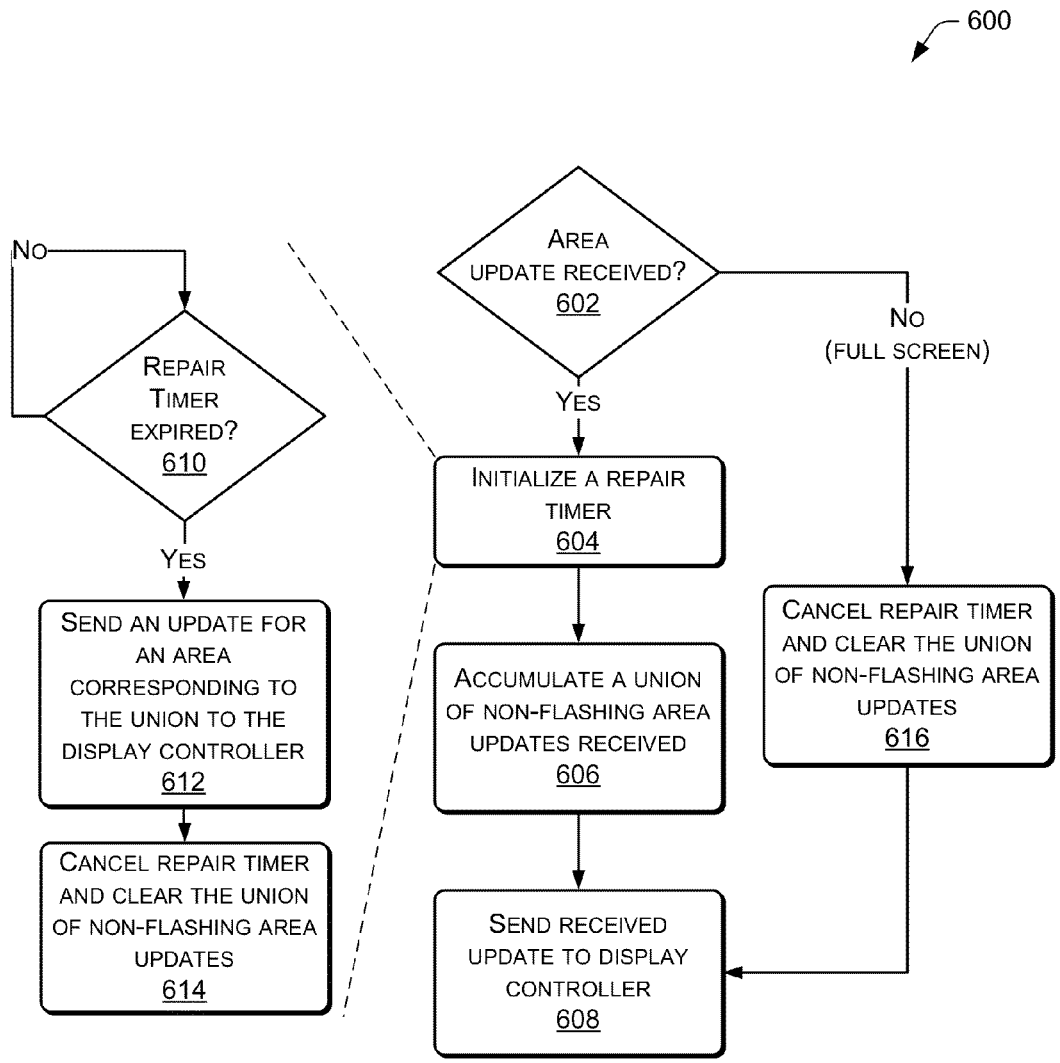
FIG. 6 is an illustrative flow diagram of a process of enhancing a constrained display.
Figure 7:
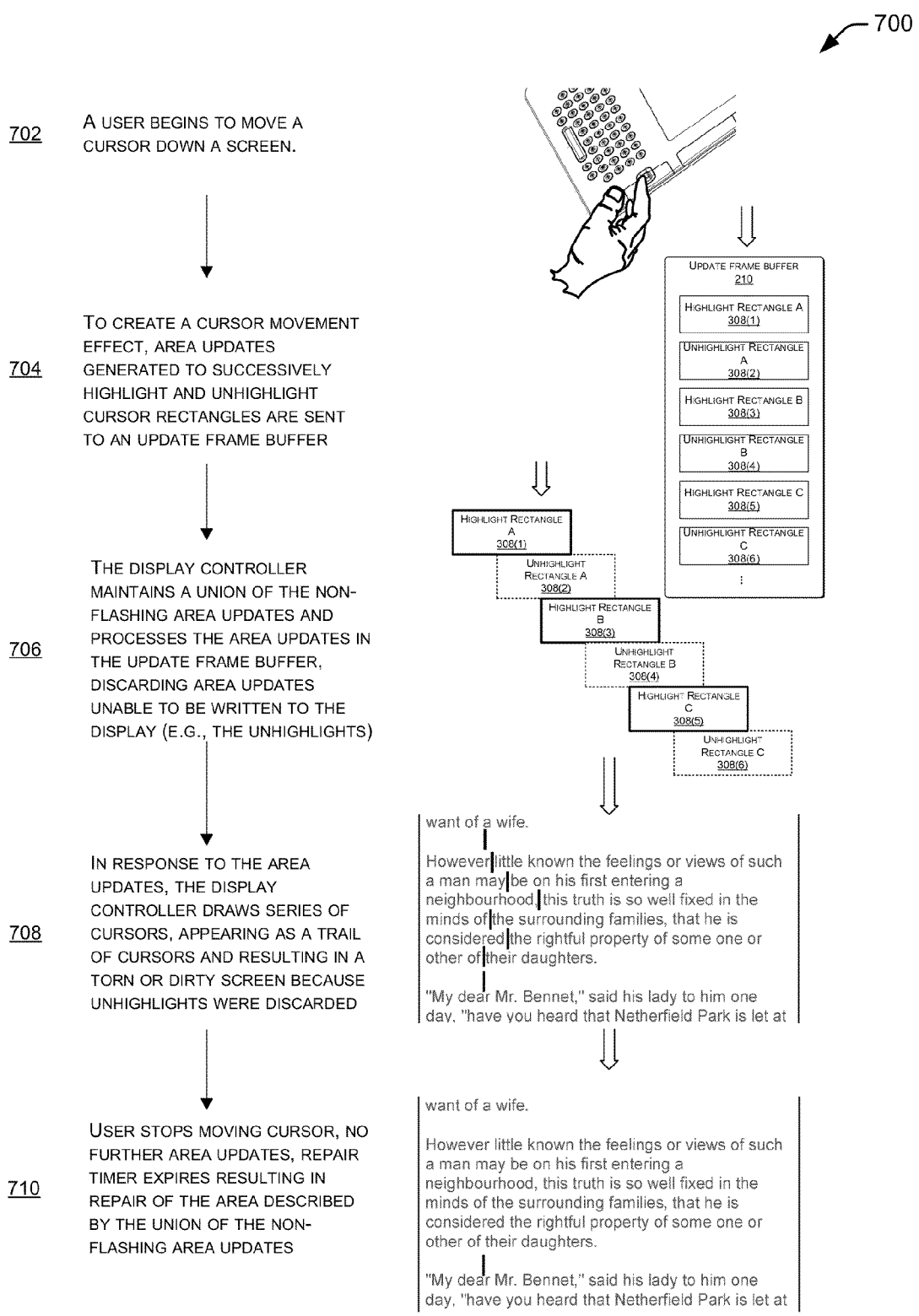
FIG. 7 is an illustrative process for enhancing a display.

FIGS. 6 and 7 illustrate example processes 600 and 700 that may be implemented by the architecture of FIGS. 1-5C or by other architectures. These processes are illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes.

FIG. 6 is an illustrative flow diagram of a process of enhancing a constrained display. The following process may be executed by the display enhancement module 102, kernel 228, display driver 232, display controller 208, or a combination thereof.

At block 602, when an area update for a portion of the screen has been received at 604 a repair timer is initialized. In some implementations, when already active the repair timer may be reset to the pre-determined interval of time rather than being re-initialized. The repair timer may be set for a pre-determined interval of time, for example, about 250 ms. In some implementations, the repair timer may be executed as a thread.

In other implementations a repair counter, repair threshold, or repair flag modified by a repair heuristic may be initialized by the repair timer. For example, a repair heuristic flag may incorporate various factors including number of updates, type of content displayed, constraints of the display device, user preferences, electronic device status such as available power, and so forth. Thus, the heuristic may set the flag to call for repairing a screen after several updates to a particular model of EPD and given a user specified preference of maximum responsiveness traded for a display which is slightly "dirtier."

At block 606, a union of non-flashing area updates which have been received is accumulated. The accumulated area may describe a rectangle within which repairs may need to be made due to non-flashing area updates possibly discarded by the display controller. Thus, by maintaining the union of the non-flashing area updates, the "dirty" area of the display is defined.

At block 608, the received update is sent to the display controller for presentation on the display. As described above with regards to FIG. 4, area updates such as the non-flashing area updates may be discarded by the display controller. Thus the fidelity of the image presented on the display may be less than that which is stored in the image buffer. For example, a rapidly moving cursor may result in a trail of cursors as illustrated above with regards to FIGS. 5A-5B as unhighlight area updates are discarded by the display controller.

Returning to block 604 which initializes a repair timer. In some implementations the repair timer may execute as a thread concurrently with the remainder of the process 600. Thus, area updates may be received and evaluated while the repair timer is either reset or awaits conditions necessary to trigger a repair, such as reaching a pre-determined time limit of no new area updates.

At block 610, when the repair timer has expired, at block 612 a repair takes place. Repairs attempt to regain the fidelity of the presentation stored in the image buffer by selectively re-drawing portions of the display which may have low fidelity due to discards by the display controller. Block 612 sends an area update corresponding to the area of the accumulated union to the display controller. This repairs the "dirty" area of the display which may result from area updates which may have been discarded by the display controller.

At block 614, the repair timer is canceled, and the accumulated union of the non-flashing area updates is cleared. This leaves the system ready to store the next non-flashing area updates which are received.

Returning to 602, when a full screen update is received, at block 616 the repair timer, if any is running, is canceled and the accumulated union of the non-flashing area updates is cleared. The repair timer is canceled and the union cleared because an update of the entire screen area rewrites the entire screen anew, thus rendering repairs unnecessary. Next, at 608 the full screen update which was received is sent to the display controller for presentation on the display. Thus, the display is clean and provides the highest fidelity image available from the image buffer.

FIG. 7 is an illustrative process 700 for enhancing a display. Operation 702 depicts a user beginning to move a cursor down a screen. For example, a user may activate a user actuable control. Operation 704 shows that a series of area updates generated to successively highlight and unhighlight cursor rectangles are sent to an update frame buffer.

Operation 706 depicts the display controller which maintains a union of the non-flashing area updates and processes the area updates in the update frame buffer. The display controller may not be able to send multiple area updates to the display, such as where two area updates attempt to alter the same pixel at the same time. Thus, area updates which conflict are discarded. As shown here, the cursor unhighlight area updates are discarded.

Operation 708 depicts the display controller drawing a series of cursors, appearing as a trail of cursors because the cursor highlight area updates have been presented by the display while the unhighlight area updates have been discarded. As a result, the screen is "dirty" with this trail.

Operation 710 shows the user having stopped moving the cursor. A repair timer expires, and the area described by the union of the non-flashing area updates as maintained above is repaired. The repair results in the "dirty" portions of the screen being updated, and the trail of cursors having disappeared. Thus, the user is left with a high fidelity representation on the screen.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims For example, the methodological acts need not be performed in the order or combinations described herein, and may be performed in any combination of one or more acts.

What is claimed is:

1. A system comprising:
   a display;
   a display controller coupled to the display;
   a memory;
   one or more processors coupled to the display controller and the memory;
   a plurality of instructions stored in the memory and configured to execute on the one or more processors, the plurality of instructions being configured to:
      receive one or more non-flashing area updates, each non-flashing area update affecting less than an entire display area;
      initiate a repair timer upon receiving the non-flashing area update affecting less than an entire display area, the repair timer configured to call a repair operation;
      accumulate a union of the received one or more non-flashing area updates;
      send the received one or more non-flashing area updates to the display controller for presentation on the display; and
   initiating the repair operation upon the expiration of the pre-determined time with no screen updates, upon the repair operation to:
      retrieve the accumulated union of non-flashing area updates;
      send a non-flashing area update for an area corresponding to the accumulated union to the display controller for presentation on the display;
      cancel the repair timer and clear the accumulated union of non-flashing area updates.

2. The system of claim 1, wherein the display is constrained such that pixels therein are operable to transition between states at less than about ten times per second.

3. The system of claim 1, wherein the display comprises an electrophoretic display.

4. The system of claim 1, wherein the display controller is configured to discard the one or more non-flashing area updates which overlap an area update which is in progress.

5. The system of claim 1, further comprising upon receiving a full screen area update:
   cancel the repair timer and clear the accumulated union of the received one or more non-flashing area updates; and
   send the full screen area update to the display controller for presentation on the display.

6. The system of claim 1, wherein the display, the display controller, or both are constrained by one or more limitations from presenting on the display a high fidelity representation of data stored within an image buffer in less than about 250 milliseconds.

7. The system of claim 1, embodied as an electronic book reader device.

8. One or more non-transitory computer-readable media storing instructions that, when executed by one or more processors, cause the one or more processors to perform acts comprising:
- receiving one or more area updates;
- initialize a repair timer, the repair timer configured to call a repair operation when a pre-determined time has passed with no screen updates;
- sending the one or more area updates to a display controller;
- discarding by the display controller the one or more area updates which are unable to be presented by the display; and
- presenting on the display the remaining one or more non-discarded area updates and resetting the repair timer.

9. The one or more non-transitory computer-readable media of claim 8, wherein the one or more area updates are determined to be unable to be presented by the display when the one or more area updates overlap an area update currently in progress.

10. The one or more computer-readable storage devices of claim 8, further comprising:
- accumulating a union of the one or more area updates received; and
- sending an area update for an area corresponding to an area encompassed by the accumulated union of the one or more area updates.

11. The one or more non-transitory computer-readable media of claim 10, wherein the repairing further comprises:
- generating from an image buffer the area update for the area corresponding to the area encompassed by the accumulated union.

12. The one or more non-transitory computer-readable media of claim 8, comprising initiating an area update of a portion of the display encompassing the one or more discarded area updates upon expiration of the repair timer.

13. The one or more non-transitory computer-readable media of claim 8, wherein the area updates comprise non-flashing area updates which result in a low-fidelity presentation on a portion of the display.

14. A method comprising:
- upon receiving one or more area updates affecting less than an entire display area:
  - accumulating a union of the area updates received;
  - sending the plurality of area updates to a display controller coupled to a display for presentation;
  - discarding by the display controller those area updates which overlap an area update currently in progress; and
  - initializing a repair timer and upon expiration of the repair timer with no full screen updates;
  - sending to the display controller an area update for an area described by the accumulated union of area updates; and
  - canceling the repair timer and clearing the accumulated union of the area updates.

15. The method of claim 14, further comprising:
- upon receiving one or more full screen updates affecting an entire display area:
  - canceling the repair timer;
  - clearing the accumulated union of area updates; and
  - sending the full screen update to the display controller.

16. The method of claim 14, wherein area updates overlap when attempting to modify one or more of the same pixels contemporaneously.

17. The method of claim 14, wherein the repair timer is configured to expire after a pre-determined interval of receiving no other area updates.

18. The method of claim 17, wherein the pre-determined interval is about 250 milliseconds.

19. A method comprising:
- initializing a repair flag, the repair flag configured to call a repair operation when a pre-determined number of area updates are preformed;
- accumulating a union of the area updates received;
- sending the area updates to a display controller coupled to a display for presentation;
- discarding by the display controller those area updates which overlap an area update currently in progress;
- updating the repair flag based on non-discarded area updates; and
- presenting on the display the non-discarded area updates.

20. The method of claim 19, wherein the display comprises an electrophoretic display.

21. The method of claim 19, further comprising:
- upon receiving one or more full screen updates affecting an entire display area:
  - canceling the repair flag;
  - clearing the accumulated union of area updates; and
  - presenting on the display the one or more full screen updates.

* * * * *